US010365994B2

(12) United States Patent
Yang et al.

(10) Patent No.: US 10,365,994 B2
(45) Date of Patent: Jul. 30, 2019

(54) DYNAMIC SCHEDULING OF TEST CASES

(71) Applicant: Facebook, Inc., Menlo Park, CA (US)

(72) Inventors: Juyuan Yang, Fremont, CA (US); Yi Zeng, Toronto (CA); Scott Kenneth Yost, Bothell, WA (US)

(73) Assignee: Facebook, Inc., Menlo Park, CA (US)

( * ) Notice: Subject to any disclaimer, the term of this patent is extended or adjusted under 35 U.S.C. 154(b) by 29 days.

(21) Appl. No.: 15/495,903

(22) Filed: Apr. 24, 2017

(65) Prior Publication Data
US 2018/0307583 A1 Oct. 25, 2018

(51) Int. Cl.
*G06F 11/36* (2006.01)
(52) U.S. Cl.
CPC ........ *G06F 11/368* (2013.01); *G06F 11/3688* (2013.01)
(58) Field of Classification Search
CPC ..... G06F 11/36; G06F 11/368; G06F 11/3688
See application file for complete search history.

(56) References Cited

U.S. PATENT DOCUMENTS

| | | | | |
|---|---|---|---|---|
| 8,539,282 | B1* | 9/2013 | Kabanov | G06F 11/3688 702/182 |
| 9,582,403 | B2* | 2/2017 | Bakowski | G06F 11/368 |
| 9,703,692 | B2* | 7/2017 | Maeoka | G06F 11/3688 |
| 2015/0067647 | A1* | 3/2015 | Bakowski | G06F 11/368 717/124 |
| 2016/0378647 | A1* | 12/2016 | Maeoka | G06F 11/3688 717/124 |
| 2017/0139819 | A1* | 5/2017 | D'Andrea | G06F 11/3688 |

* cited by examiner

*Primary Examiner* — Emerson C Puente
*Assistant Examiner* — Erika Kretzmer
(74) *Attorney, Agent, or Firm* — FisherBroyles, LLP

(57) ABSTRACT

Dynamically scheduled testing of a software application on one or more devices are disclosed. The system can schedule and execute of one or more test cases associated with a software application. When a device becomes available for testing, the system can determine the list of commits that have not yet been tested. If there are outstanding untested commits, the system can determine the list of test cases in a test plan that are to be scheduled and executed. For each test in the list of test cases, the system can compute an urgency value. Urgency value can be a function of the untested commits. For example, urgency value can be the number of untested commits associated with each test case. The system can then sort the test cases based on the urgency value and schedule the most "urgent" test case for execution.

20 Claims, 6 Drawing Sheets

DYNAMIC SCHEDULING OF TEST CASES

BACKGROUND

Software applications and products are typically subjected to various test cases prior to and in the early stages of development and deployment. For example, during bug fixing or feature enhancement, a fairly typical design practice involves running (or re-running) all of the test cases in a test plan for the software application to help validate (or re-validate) the application and make sure the new code changes do not "break" any existing functionality. The software code for an application is generally stored in a code repository. When a change is made to a portion of the software code, it is "checked-in" or "committed" to the repository. Upon each committal ("commit"), the test plan may execute (or run) one or more test cases. It may be unnecessary to re-run all the test cases in the test plan because a given commit need not necessarily affect how all test cases perform. For example, some commits have limited scope and, as a result, only a subset of test cases need to be run (or re-run) to ensure that the commit did not "break" any existing functionality.

The number of test cases that are executed for a software application depends on several factors, such as how large and/or complicated the program is, whether/how it relates to mission-critical or other key operations, the extent to which it interacts with other systems, etc. An enterprise product is typically subjected to thousands of test cases prior to deployment. Moreover, depending on the application being tested, the platform for running the test cases may vary. For example, a change to the code of software application that can be deployed on several different devices (e.g., smartphones, tablets, laptops, etc.) may require running the test cases associated with the code change(s) (commits) on each device that supports the software application. As a result, testing of large and/or complicated software application on different devices can be challenging because it can require execution of numerous test cases that take a long time to execute on a limited number of available devices. The problem gets compounded due to continuous development where multiple software developers are checking-in code (i.e., multiple commits) at the same time. Also, certain commits may result in regression where a software bug may make an application feature to stop functioning as intended. Regression testing may be required to prevent regression.

Examples of current test methodology for testing a software application that can be deployed on several different device involve waiting for a certain number of commits (e.g., 20) of new code before running test cases. This results in peaks and valleys in demand for devices on which the software application is being tested because developers can check in code at random times. This may also result in bad code to get deployed to a production environment if the code change is not tested in a timely and efficient manner. Thus, there exists a need for a software testing system and method that overcomes these and other drawbacks of existing test methodologies. A new system and method is disclosed that dynamically schedules testing based on when the test cases were last executed. Test cases are ordered based on the which commit they were last executed on (e.g., test cases with older untested commits may be scheduled first). The order is then adjusted based on one or more of the following factors: a priority multiplication factor, a maximum amount of time since last execution, and a maximum number of commits since last execution.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

A dynamic scheduling system and method that enables scheduling and execution of one or more test cases associated with a software application is disclosed herein. In some implementations, when a device becomes available for testing, the system performs several steps to dynamically schedule test cases to optimize resource usage. A device may be considered to be available when the number of jobs in a queue for the device fall below a specified threshold value. After a device becomes available, the system can determine the list of commits that have not yet been tested. If there are remaining untested commits, the system determines the list of test cases in a plan that are to be scheduled and executed. For each test in the list of test cases, the system computes an urgency value. Urgency value can be a function of the untested commits. For example, urgency value can be the number of untested commits associated with each test case. The system then sorts the test cases based on the urgency value and schedules the most "urgent" test case for execution.

In some implementations, one or more parameters can be used to adjust how often and when a test case is scheduled for execution. For example, a maximum commit gap parameter can be used to enforce that each test case is run at most every N commits. A maximum time gap parameter can be used to enforce that each test is scheduled at least every N hours. A priority factor can be used to designate a test case as more or less important. In some implementations, each commit associated with a test case can be assigned a weight factor based on, for example, the likelihood that it will cause regression. In some implementations, each unit of wait time for testing associated with a commit can be assigned a weight factor based on, for example, the total wait time that one or more commits can wait before getting tested.

The disclosed system and method have several advantages. Although several advantages are described in this disclosure, not all advantages are required in each implementation of the system. Also, some advantages will become apparent to those having ordinary skill in the art after reviewing the disclosure. One advantage is that the dynamic scheduling system and method can minimize the time to detect regressions caused by a code check-in (commit). Another advantage of the dynamic scheduling system and method is that it can automatically adapt to changes in test-commit load and device capacity. Further, since the dynamic scheduling system and method is flexible, it can accommodate test cases that require faster turnaround time. The dynamic scheduling system and method can also incorporate heuristics by utilizing knowledge related to when a commit may affect a test case, and/or cause regression.

Figure 1:
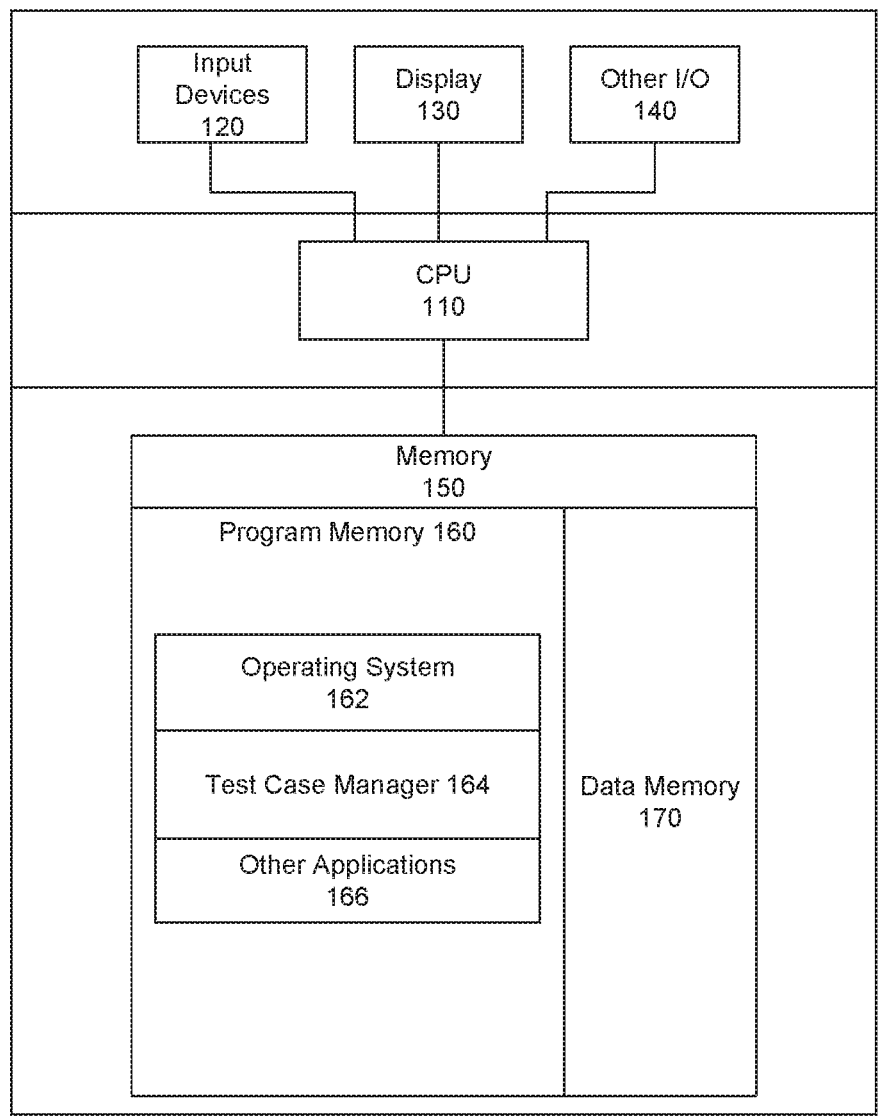
FIG. 1 is a block diagram illustrating an overview of devices on which some implementations can operate.

Turning now to the figures, FIG. 1 is a block diagram illustrating an overview of devices on which some implementations of the disclosed technology can operate. The devices can comprise hardware components of a device 100 that performs dynamic scheduling of test cases. Device 100 can include one or more input devices 120 that provide input to the CPU (processor) 110, notifying it of actions. The actions are typically mediated by a hardware controller that interprets source code changes received from the input device and communicates the information to the CPU 110 using a communication protocol. Input devices 120 include, for example, a computer, a laptop, a mobile device (e.g., smartphone, tablets, etc.), or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. The display 130 can provide information related to test case scheduling, test case execution, tested commits, untested commits, etc. Examples of display devices are an LCD display screen, an LED display screen, and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; rather a memory is non-transitory. Memory 150 can include program memory 160 that stores programs and software, such as an operating system 162, test case manager 164, and other application programs 166. Memory 150 can also include data memory 170 that can include user data such as passwords, usernames, input text, audio, video, user preferences, and selections. Data memory 170 can also include configuration data, settings, user options, time stamps, or session identifiers. Data in memory 170 can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, mobile devices, multiprocessor systems, microprocessor-based systems, set-top boxes, programmable consumer electronics, network PCs, minicomputers, mainframe computers, and distributed computing environments that include any of the above systems or devices, or the like.

Figure 2:
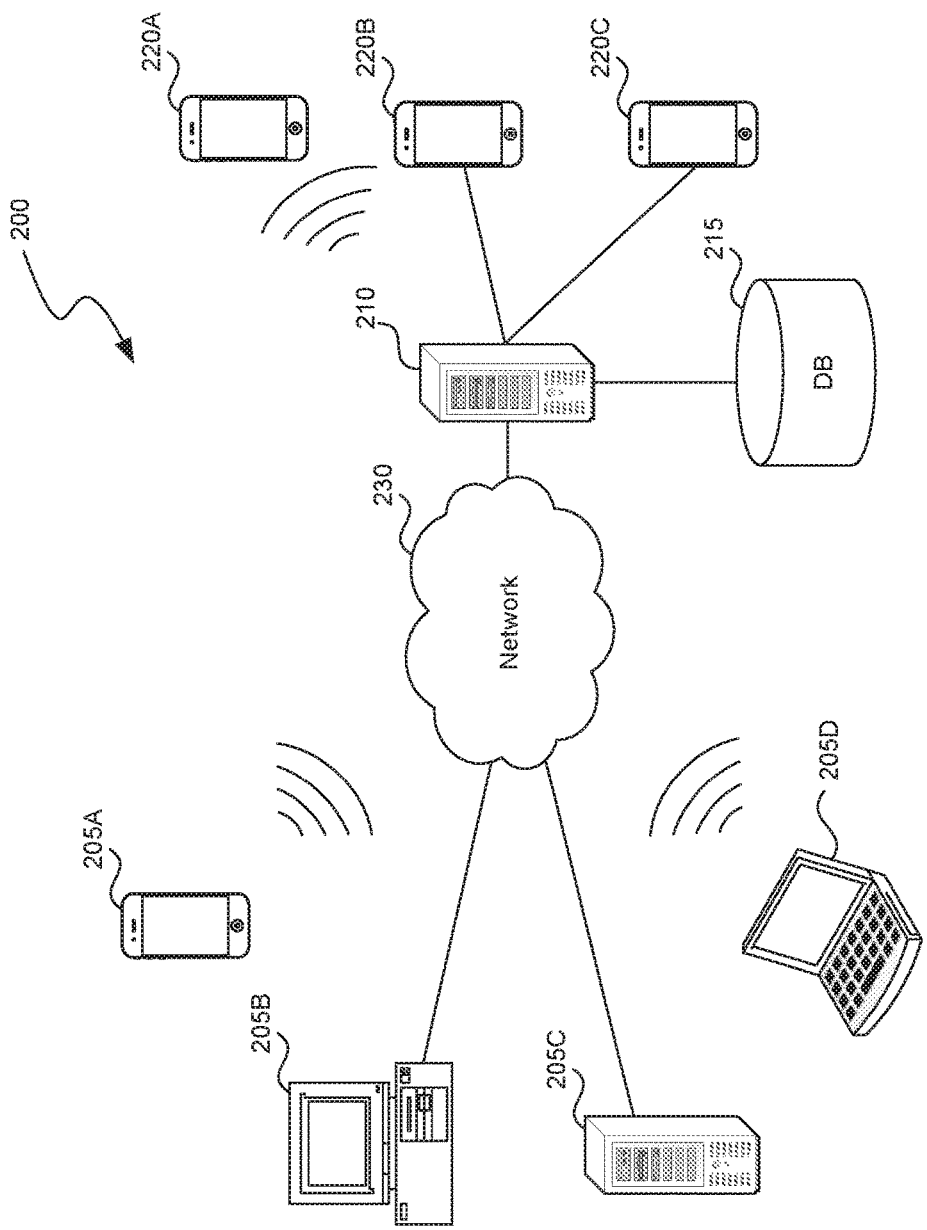
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include, but are not limited to, personal computers, server computers, handheld or laptop devices, cellular telephones, wearable electronics, tablet devices, mobile devices, multiprocessor systems, microprocessor-based systems, set-top boxes, programmable consumer electronics, network PCs, minicomputers, mainframe computers, and distributed computing environments that include any of the above systems or devices, or the like. Client computing devices 205A-D can comprise computing systems, such as device 100. The source code for an application can be stored on one or more client computing devices 205A-D. Changes to the source code can be made on the client computing devices 205A-D and checked-in (committed) through network 230 to one or more computers, such as a server computing device 210. A server computing device 210 can comprise computing systems, such as device 100. Though the server computing device 210 is displayed logically as a single server, server computing devices can each be a distributed computing environment encompassing multiple computing devices located at the same or at geographically disparate physical locations. In some implementations, each server computing device 210 corresponds to a group of servers. The server computing device 210 can connect to a database 215. In some implementations, a server computing device 210 can be a web server or an application server. As discussed above, each server computing device 210 can correspond to a group of servers, and each of these servers can share a database or can have their own database. Database 215 can warehouse (e.g. store) information such as one or more test plans with test cases, source code for an application, execution details (e.g., execution time stamp, execution run time) of one or more test cases, test case execution schedule, maximum commit gap parameters, maximum time gap parameters, priority factors, weight factors, source code commit details (e.g., commit time stamp, commit wait time, commit dependencies). Though database 215 is displayed logically as a single unit, it can be a distributed computing environment encompassing multiple computing devices, can be located within its corresponding server, or can be located at the same or at geographically disparate physical locations.

Server computing device 210 can be connected to one or more devices 220A-C. The changes (commits) to the source code for an application can be tested on the devices 220A-C. Examples of devices 220A-C include, but are not limited to, smartphones, tablets, laptops, personal computers, etc. Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. Although the connections between server 210 and devices 220 are shown as separate connections, these connections can be any kind of local, wide area, wired, or wireless network, including network 230 or a separate public or private network.

Figure 3:
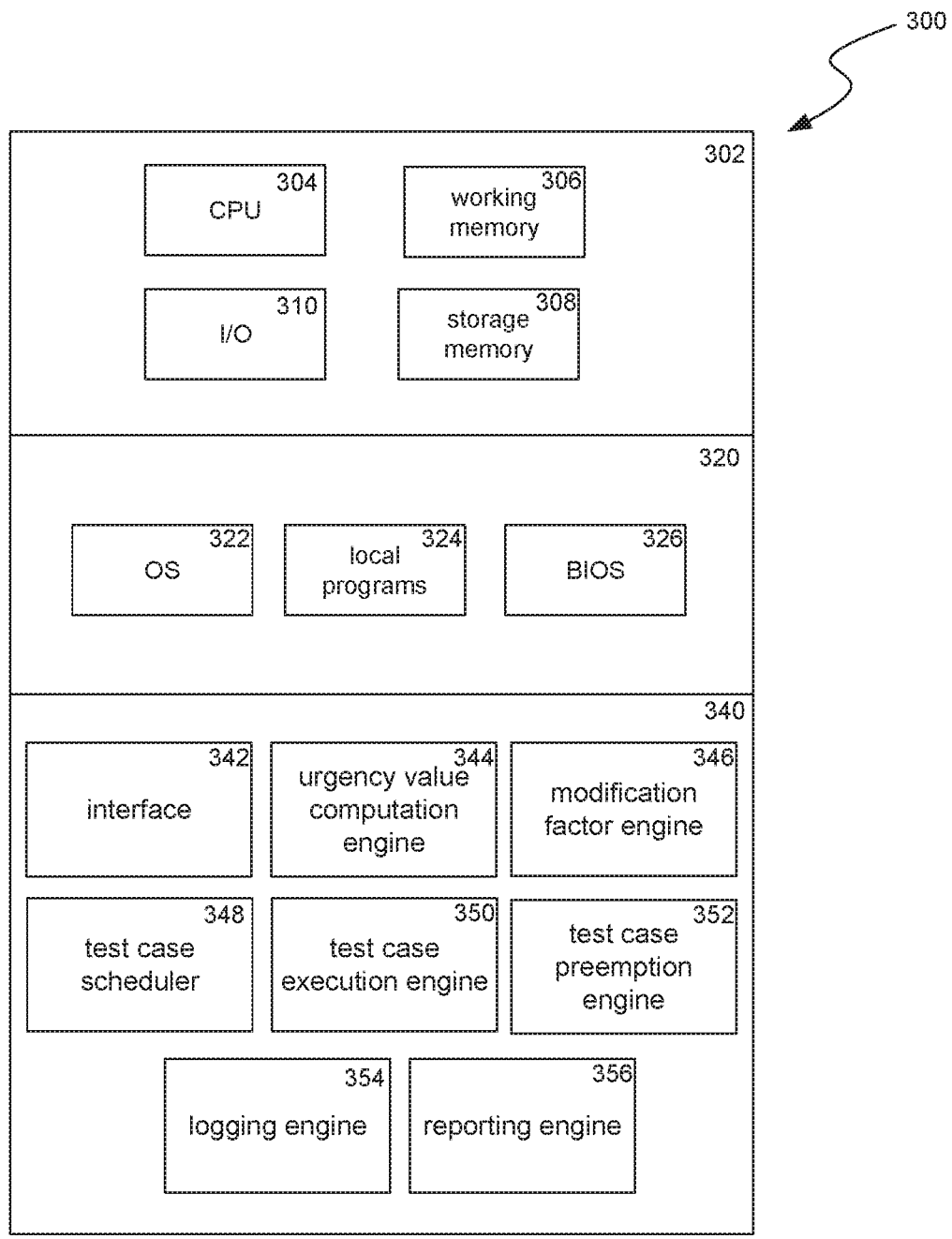
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210.

General software 320 can include various applications including an operating system 322, local programs 324, and a basic input output system (BIOS) 326. Specialized components 340 can be subcomponents of a general software application 320, such as local programs 324. Specialized components 340 can include urgency value computation engine 344, modification factor engine 346, test case scheduler 348, test case execution engine 350, test case preemption engine 352, logging engine 354, reporting engine 356, and components which can be used for transferring data and controlling the specialized components, such as interface 342. In general, all or some of the specialized components 340 can be included in the test case manager 164 (as shown in FIG. 1).

Urgency value computation engine 344 can be configured to compute an urgency value for each test case in one or more test plans associated with the software code for an application. The urgency value for a test case can be a function of the untested commits. For example, the urgency value for a test case can be the number of untested commits. In some implementations, the urgency value for a test case can be the total wait time for each untested commit associated with the test case. Using an urgency value computation can reduce total wait time for a commit. Wait time for a commit is the time between when a commit arrives and when it is tested either directly or indirectly by having a later commit tested.

In some implementations, the urgency value computation engine 344 assigns a weight to each commit when computing the urgency value for a test case. A weight value can reflect the probability that a commit will cause regression as compared to the average commit. For example, if a commit is one-fifth as likely to cause regression compared to the average commit, it can be assigned one-fifth of the weight of a normal commit. If the weight reflects a real probability of causing regression, then the urgency value computation engine can minimize the total wait time for regressing commits, resulting in increased efficiency of the computing system(s) for executing test cases.

In some implementations, the urgency value computation engine 344 assigns different weight to each second of wait time. For example, the urgency value computation engine 344 can assign a weight value to the wait times for two commits (Commit_A and Commit_B) such that instead of Commit_A waiting for 1 hour an Commit_B waiting for 3 hours, both Commit_A and Commit_B wait for 2 hours each. This can be done by computing an urgency value which is a function of the wait times of untested commits and a commit age factor. That is, instead of selecting the test case which has the highest value of commits waiting for the longest time (i.e., sum(f(commit) for commit in commits) where f(commit)=commit.wait_time), the urgency value computation engine 344 can multiply the wait time for each commit by a commit age factor (i.e., sum(f(commit) for commit in commits) where f(commit)=commit.wait_time*commit_age_factor). The urgency value computation engine 344 can select the value of the commit age factor based on wait time preferences.

Modification factor engine 346 can be configured to compute one or more factors that can be used to modify the urgency value for test cases. Each test case can be modified by one or more modification factors that affect how often and when the test case gets scheduled. In some implementations of the invention, a maximum commit gap parameter can be used to enforce that each test case be run at most every N commits. Commit gap size is the number of commits between each test. For example, if test cases are tested every five (5) commits, the commit gap size is five (5). If device capacity is unable to meet the requirement of the maximum commit gap parameter, test cases can be queued. Depending on the value of the maximum commit gap parameter, if device capacity is healthy, the maximum commit gap parameter value is hit only briefly during peak hours. An optimum maximum gap commit parameter value can be used to reduce the time it takes to detect regression caused by one or more commits, and thus reduce the bisect range used to search the commit when regression was introduced. This can be done by searching, using a regression detection algorithm (e.g., a bisect range command that uses a binary search algorithm), when a particular regression was introduced in the source code history. Regression detection algorithms can check the source code at different moments when code was committed and test cases were run to determine which commit caused regression. A smaller commit gap size can ensure that a regression detection algorithm can detect regression sooner than when a larger commit gap size is used. A smaller commit gap size can further ensure that the number of regressions introduced between commits is minimized as a regression will likely be detected sooner than with a larger commit gap size. Also, an optimum maximum gap commit parameter value can reduce (or ultimately remove) the need for human intervention to detect broken commits. An optimum maximum gap commit parameter value can further result in optimization of one or more computing resources for testing a software application. It can also increase the efficiency of the computing system(s) for executing test cases in a test plan that detect errors introduced by source code changes (commits) by reducing wait time.

In some implementations of the invention, a maximum time gap parameter can be used to enforce that each test case is scheduled at least every N hours. If device capacity is unable to meet the requirement of the maximum time gap parameter, test cases can be queued. If a test case is already scheduled to be run (e.g., it is in the test case queue), the maximum time gap parameter may not be triggered. Test cases can have a large diversity of commit rates. The maximum time gap parameter prevents test cases with many commits from badly starving test cases with few commits. The maximum time gap parameter value is usually hit only for test cases with fewer commits. If the maximum time gap parameter is hit often for many tests, the bound may be too tight and can require adjustment. Typical regression detection algorithms require three (3) data points after a possible regressing commit to trigger. The maximum time gap parameter can reduce the time for three data points to arrive for tests with fewer commits. The conditions preventing the maximum time gap parameter from queueing multiple jobs for the same test case can conserve capacity if the computing system for testing a software application is backlogged.

In some implementations of the invention, a priority factor can be used to modify the urgency value of a test. A higher priority factor can be used to indicate that a test case is more important (e.g., a flagship metric test case). A test case that does not require fast turnarounds can be assigned a lower priority factor. In some implementations of the invention, setting the value of a priority factor to zero (0) can result in the test case to run only when no other test cases have untested commits or when other criteria (e.g., maximum commit gap parameter and/or maximum time gap parameter) are triggered. In some implementations of the invention, setting the value of a priority factor to minus one (−1) can cause a test case to run only when the maximum gap parameters are triggered.

Test case scheduler 348 can be configured to schedule test cases in a test plan. For example, based on the urgency value associated with the test cases, they can be added to test cases buffer, such as a queue or a stack. Test case scheduler 348 can maintain a test cases buffer for each device on which the software application can be tested. Test cases execution engine 350 can select and execute one or more test cases for execution from the test cases buffer on one or more devices. Test cases preemption engine 352 can be configured to preempt execution of a test case based on one or more factors. Logging engine 354 can maintain a log of test cases scheduling and execution including details such as, test case number, commits associated with test case, commit wait time, urgency value, current total urgency value, schedule timestamp, expected execution timestamp, actual execution timestamp, total execution time, execution result, etc. Reporting engine 356 can be configured to perform analytics and reporting functions related to test cases scheduling and execution. For example, reporting engine 356 can be used to determine if the system employing the disclosed technology is staying under the boundary values (i.e., within the various parameter values that can be associated with a test plan).

Figure 4:
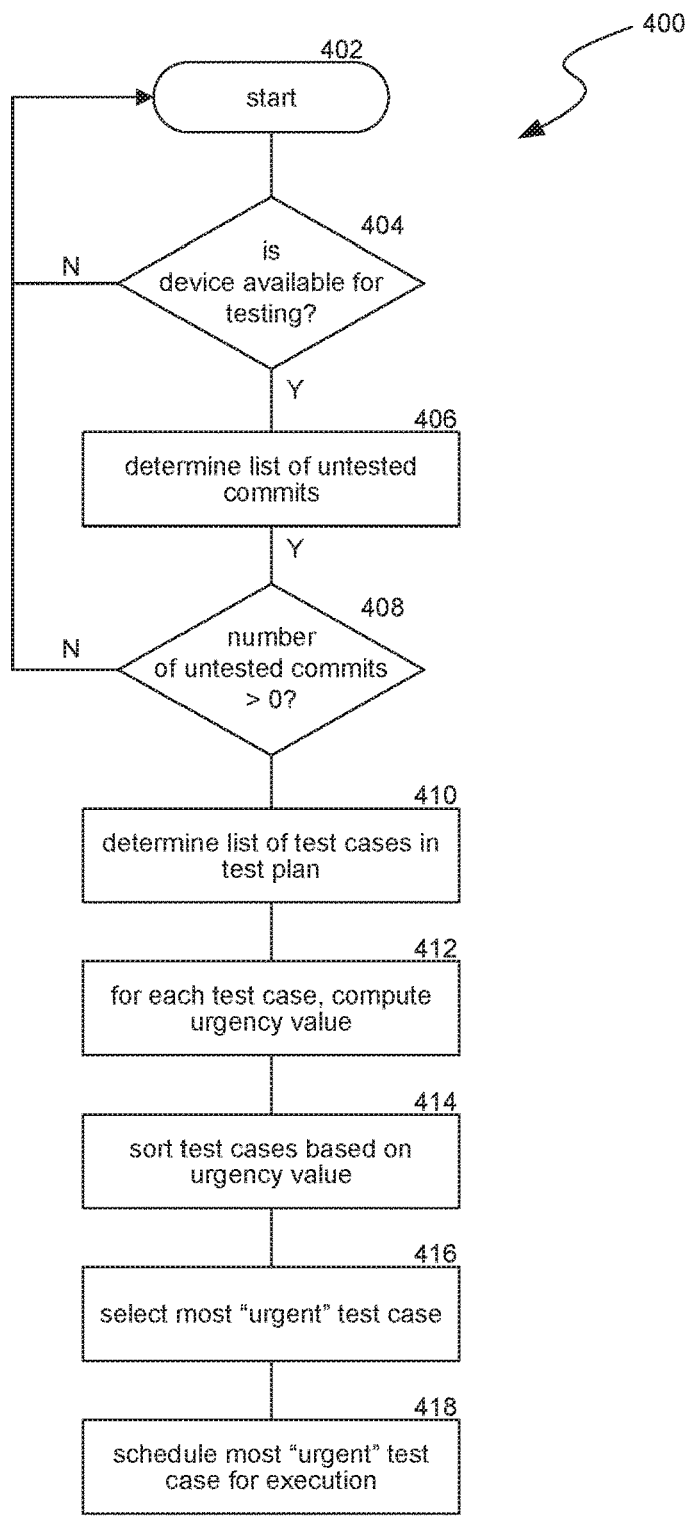
FIG. 4 is a flow diagram illustrating a process used in some implementations for dynamic scheduling of test cases.

FIG. 4 is a flow diagram illustrating a process 400 used in some implementations for dynamic scheduling of test cases. Process 400 begins at block 402 and continues to block 404. At decision block 404, process 400 can determine whether a device is available for testing. A device can be available for testing when the number of jobs in the queue is below a certain threshold. The threshold can be pre-determined based on a manual input, an automated algorithm, or a combination of the two. In some implementations, the threshold can be determined dynamically based on one or more factors, such as, total number of available devices, type of devices, priority of untested commits, etc. If a device is available, the process 400 proceeds to block 406.

At block 406, process 400 determines the list of untested commits for the device. At block 408, process 400 determines if the number of untested commits is greater than zero (0). That is, process 400 determines if there are commits that have yet to be tested on the device. If untested commits exist, the process 400 proceeds to block 410. At block 410, process 400 determines the list of test cases in a test plan for the software application being tested. One or more test plans can be associated with a software application. A test plan can be selected based on the device type, availability of other devices, etc. A test plan can comprise one or more test cases. At block 412, process 400 determines urgency values associated with test cases in the selected test plan using, for example, the urgency value computation engine 344 discussed above in reference to FIG. 3. At block 414, test cases can be sorted based on urgency values of the test cases using a sorting algorithm. Depending on the testing strategy goals, different sorting techniques can be utilized for sorting test cases. For example test cases can be sorted in decreasing order of urgency value to select the most "urgent" test case at block 416. The most "urgent" test case can be the test case with the highest urgency value. At block 418, the most "urgent" test case can be scheduled by adding it to a test cases buffer associated with the device. Process 400 can repeat process 400 when a test case is scheduled.

Figure 5:
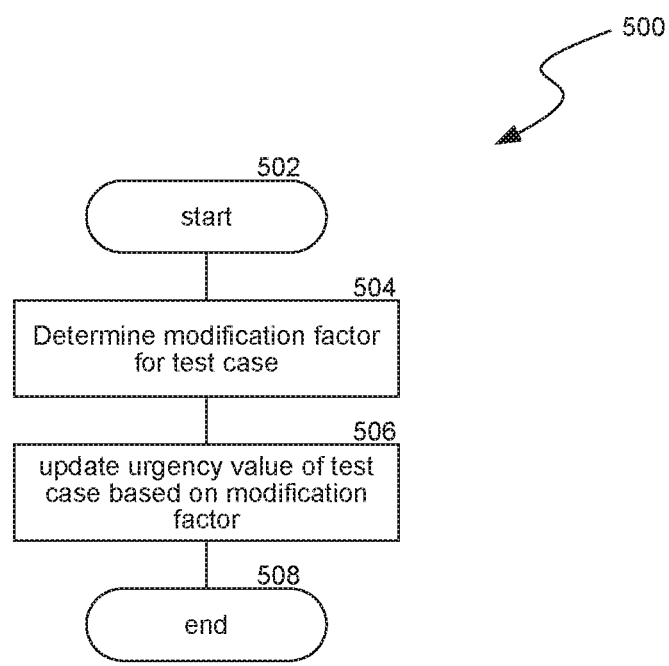
FIG. 5 is a flow diagram illustrating a process used in some implementations for adjusting the urgency value of test cases.

FIG. 5 is a flow diagram illustrating a process 500 used in some implementations for adjusting the urgency value of test cases. Process 500 begins at block 502 and continues to block 504. In some implementations, process 500 can be called by process 400 at block 412. At block 504, process 500 can determine one or more modification factors for a test case, using for example, the modification factor engine 346 discussed above in reference to FIG. 3. Modification factors can be selected based on one or more testing strategy goals. For a testing strategy goal involving testing every N commits, the priority factor can be set to minus one (−1), the maximum commit gap parameter can be set to N and the maximum time gap parameter can be set to infinity. For a testing strategy goal involving testing every N hours, the priority factor can be set to minus one (−1), the maximum commit gap parameter can be set to infinity and the maximum time gap parameter can be set to N. Unimportant tests can be set to run every twelve (12) hours using this approach. They may run less frequently if the device is backlogged due to the maximum time gap parameter refusing to queue more than one job for a single test. Once the modification factors and their values are selected, then at block 506, process 500 can update the urgency value for the test case based on the modification factor(s). Process 500 can then continue to block 508, where it ends.

Figure 6:
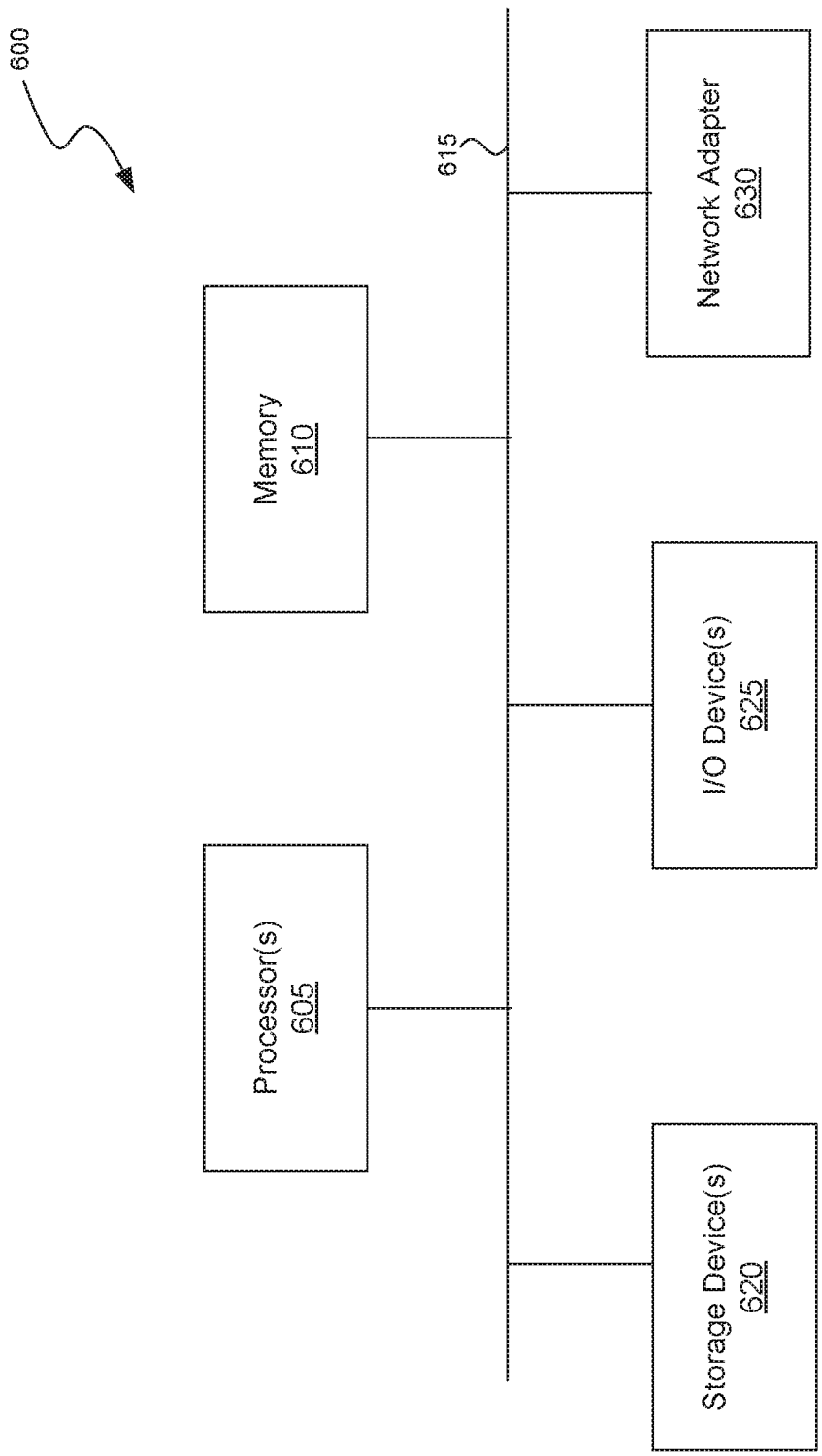
FIG. 6 is a block diagram of a processing system that can implement operations consistent with various implementations.

FIG. 6 is a block diagram of a processing system that can implement operations consistent with various implementations. The computing system 600 may be used to implement any of the entities, components or services depicted in the examples of the foregoing figures (and any other components and/or modules described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described implementations. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 610 can be implemented as software and/or firmware to program the processor(s) 605 to carry out actions described above. In some implementations, such software or firmware may be initially provided to the processing system 600 by downloading it from a remote system through the computing system 600 (e.g., via network adapter 630).

The implementations introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A non-transitory computer-readable storage medium storing instructions that, when executed by a computing system, cause the computing system to perform operations for dynamically scheduling testing of test cases in a list of test cases, the operations comprising:

determining a list of untested commits, wherein each commit is associated with a modified copy of a source code file;

for each selected test case in the list of test cases, computing, by an urgency value computation engine, an urgency value of the selected test case such that the urgency value is initially computed as a number of untested commits associated with the selected test case;

sorting the test cases in the list of test cases in decreasing order of urgency value;

identifying a test case for execution from the list of test cases as the most urgent test case based on the computed urgency value of the test case being the highest urgency value from among urgency values computed for the list of test cases; and executing the most urgent test case prior to executing a remainder of the test cases in the list of test cases.

2. The non-transitory computer-readable storage medium of claim 1 wherein the operations further comprise:
adjusting the urgency value of the selected test case based on a priority factor.

3. The non-transitory computer-readable storage medium of claim 1 wherein the operations further comprise:
adjusting the urgency value of the selected test case based on a number of commits since a previous execution of the selected test case.

4. The non-transitory computer-readable storage medium of claim 1 wherein the operations further comprise:
adjusting the urgency value of the selected test case based on a previous execution timestamp of the selected test case.

5. The non-transitory computer-readable storage medium of claim 1 wherein the operations further comprise:
associating a weight value with at least one untested commit in the list of untested commits, wherein the weight value is based on a probability of regression caused by the at least one untested commit; and
adjusting the urgency value of the selected test case based on weight values of untested commits associated with the selected test case.

6. The non-transitory computer-readable storage medium of claim 1 wherein the operations further comprise:
computing a wait time for each untested commit in the list of untested commits; and
adjusting the urgency value of the selected test case based on wait times of untested commits associated with the selected test case.

7. The non-transitory computer-readable storage medium of claim 1 wherein the operations further comprise:
logging the urgency value of each test case in the list of test cases.

8. A method performed by a computing system for dynamically scheduling testing of test cases in a list of test cases, comprising:
determining a list of untested commits, wherein each commit is associated with a modified copy of a source code file;
for each selected test case in the list of test cases, computing, by an urgency value computation engine, an urgency value of the selected test case such that the urgency value is initially computed as a number of untested commits associated with the selected test case;
sorting the test cases in the list of test cases in decreasing order of urgency value;
identifying a test case for execution from the list of test cases as the most urgent test case based on the computed urgency value of the test case being the highest urgency value from among urgency values computed for the list of test cases; and
executing the most urgent test case prior to executing a remainder of the test cases in the list of test cases.

9. The method of claim 8, further comprising:
adjusting the urgency value of the selected test case based on a priority factor.

10. The method of claim 8, further comprising:
adjusting the urgency value of the selected test case based on a number of commits since a previous execution of the selected test case.

11. The method of claim 8, further comprising:
adjusting the urgency value of the selected test case based on a previous execution timestamp of the selected test case.

12. The method of claim 8, further comprising:
associating a weight value with at least one untested commit in the list of untested commits, wherein the weight value is based on a probability of regression caused by the at least one untested commit; and
adjusting the urgency value of the selected test case based on weight values of untested commits associated with the selected test case.

13. The method of claim 8, further comprising:
computing a wait time for each untested commit in the list of untested commits; and
adjusting the urgency value of the selected test case based on wait times of untested commits associated with the selected test case.

14. The method of claim 8, further comprising:
logging the urgency value of each test case in the list of test cases.

15. A system for dynamically scheduling testing of test cases in a list of test cases, comprising:
at least one hardware processor coupled to a network; and
a memory configured to store processor-executable components, wherein the processor-executable components further comprise:
a component configured to determine a list of untested commits, wherein each commit is associated with a modified copy of a source code file;
a component comprising an urgency value computation engine to compute, for each selected test case in the list of test cases, an urgency value of the selected test case such that the urgency value is initially computed as a number of untested commits associated with the selected test case;
a component to sort the test cases in the list of test cases in decreasing order of urgency value;
a component to adjust the urgency value of the selected test case based on a modification factor;
a component configured to identify a test case for execution from the list of test cases as the most urgent test case based on the computed urgency value of the test case being the highest urgency value from among urgency values computed for the list of test cases; and
a component to execute the most urgent test case prior to executing a remainder of the test cases in the list of test cases.

16. The system of claim 15 wherein the modification factor is based on a priority value associated with the selected test case.

17. The system of claim 15 wherein the modification factor is based on a number of commits since a previous execution of the selected test case.

18. The system of claim 15 wherein the modification factor is based on a previous execution timestamp of the selected test case.

19. The system of claim 15 wherein the processor-executable components further comprise a component configured to:
associate a weight value with at least one untested commit in the list of untested commits, wherein the weight value is based on a probability of regression caused by the at least one untested commit; and
adjust the urgency value of the selected test case based on weight values of untested commits associated with the selected test case.

20. The system of claim 15 wherein the processor-executable components further comprise a component configured to:

compute a wait time for each untested commit in the list of untested commits; and adjust the urgency value of the selected test case based on wait times of untested commits associated with the selected test case.

\* \* \* \* \*